United States Patent Office 3,125,461
Patented Mar. 17, 1964

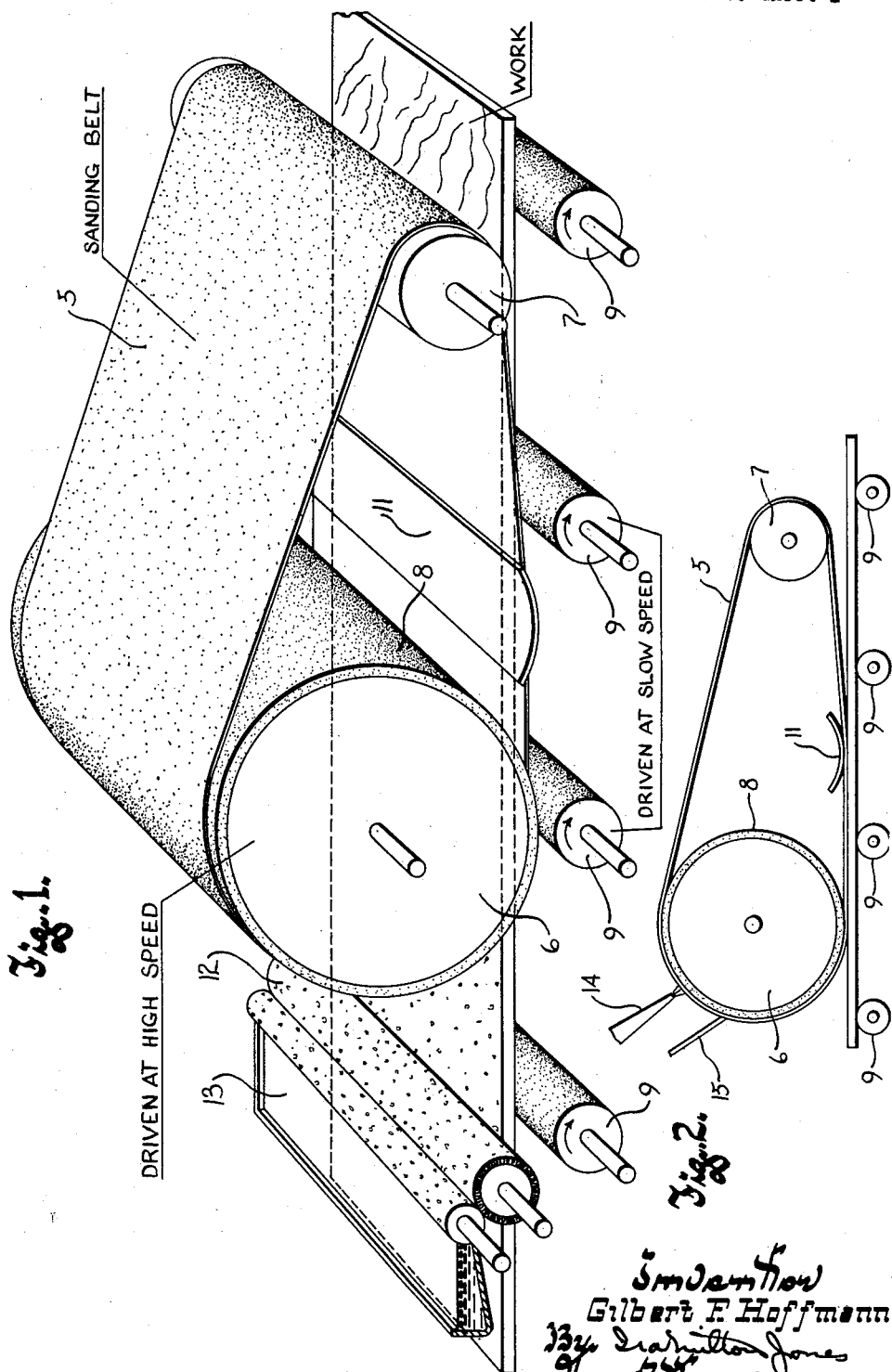

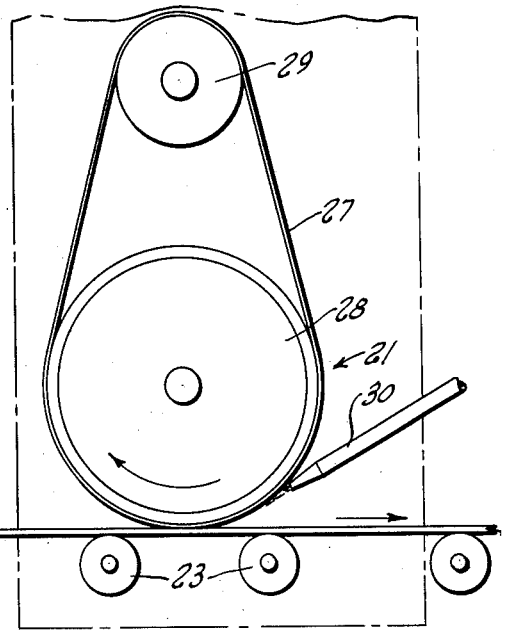
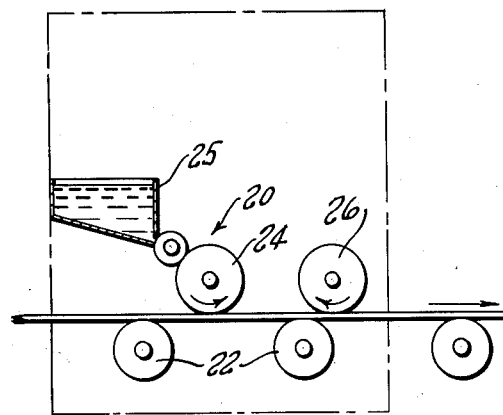
Fig. 3.
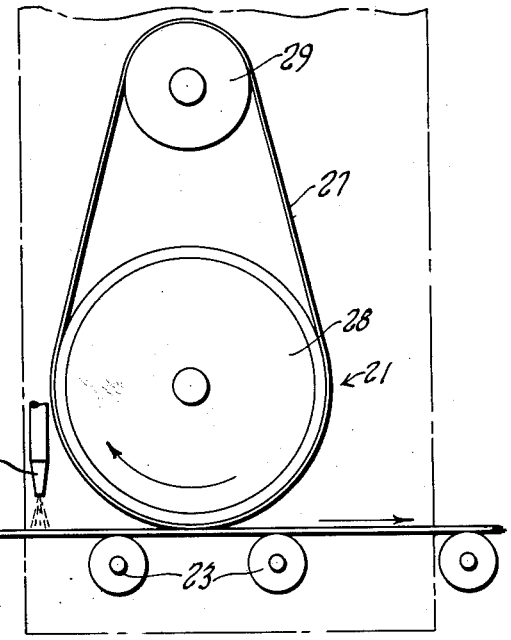
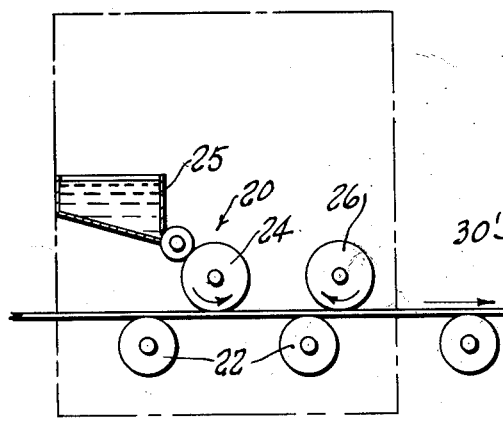
Fig. 4.
Inventor
Gilbert F. Hoffmann

3,125,461
METHOD OF PREPARING WOOD AND PARTICLE BOARD SURFACES FOR FINISHING
Gilbert F. Hoffmann, Mukwonago, Wis., assignor to Sand-In Corporation, Milwaukee, Wis., a corporation of Wisconsin
Filed Feb. 27, 1963, Ser. No. 261,540
13 Claims. (Cl. 117—65.2)

This invention, like that of my application Serial No. 40,332, now abandoned, of which this is a continuation-in-part, relates to an improved technique for preparing the surface of wood and particle board for the reception of protective and beautifying finish coats, particle board being a manufactured product consisting of wood flakes and chips and even saw dust bonded together by a synthetic glue, such as urea formaldehyde.

Heretofore, the customary and conventional way of preparing a wood surface for finishing has been to first sand it smooth, and then close its pores with a suitable filler. With the application of the filler and perhaps a sealer coat, the many tiny nibs and fibers which characterize a sanded wood surface, though they may be imperceptible to the naked eye, rose and became very pronounced. Further sanding thus was inevitable.

Moreover, when the first of the finishing coats was applied to the filled and resanded surface, the grain would rise again, more or less depending upon the hardness of the wood, which necessitated additional sanding.

Prior attempts at improving the technique of preparing wood surfaces for finishing, such as the "Microseal" process disclosed in Patent No. 2,827,935, by which the sanded surface is burnished using heat and pressure, sought to obviate the need for the customary filler, and to some extent succeeded in this respect, but these prior methods still required two entirely separate operations—sanding and burnishing. Moreover, burnishing to close the pores is not at all satisfactory in the case of particle board, nor where the grain of the wood is to be preserved or accentuated.

By contrast, this invention makes it possible and commerically feasible to sand a wood or particle board surface, fill its surface pores, seal and color its surface, and impart the desired smoothness and density thereto—all in one simple operation.

This very desirable result has been made possible by the discovery that a wood or like surface can be sanded while wet with any liquid synthetic resinous composition, containing a suitable coloring agent if coloring is desired, provided the abrasive surface of the sanding belt used is kept wet—at least in the abrading zone—with a liquid that is at best a poor solvent for the resinous composition. Examples of such liquids are mineral spirits and naptha. When kept wet with such a liquid, the abrasive surface of the sanding belt remains fully functional and the particles abraded from the surface, become coated with the resinous binder of the composition, and are driven into the surface pores and locked therein by the adhesion of the resinous binder with the wood surface.

The resinous composition used to wet the surface may consist of any of the coating compositions customarily used on wood surfaces, such as synthetic resin chemical coatings, lacquers, and varnishes, all of which, of course, are film-forming. Better results are obtained, through if an additive in the form of a highly polymerized synthetic resin polymerizate is added to the coating composition.

As my aforesaid application Serial No. 40,332, brings out, it is also possible to effect significant saving in the cost of preparing the surface of wood and particle board and to obtain an improved result by using only a highly polymerized synthetic resin polymerizate dispersed in a liquid in which the polymerizate is insoluble. Since the polymerizate does not fuse, it does not gum or clog the abrasive surface of the sandpaper; and by keeping the zone of activity wet with a non-solvent, or at best a poor solvent for the synthetic resin polymerizate, the abrasive surface of the sanding belt remains fully functional, while the softened polymerizate combines with the particles removed from the surface by the sanding operation and, so combined, is driven or compacted into the pores of the surface undergoing treatment.

The "wet" sanding operation of this invention not only effectively closes and seals the surface pores, but also leaves the surface far smoother and denser than conventional dry sanding could achieve; and if a film-forming coating composition is used, either with or without the high polymer additive, the one operation saturates the surface pores and seals the surface with a binder, and where coloring is desired does this also. Thus in a single operation the surface is prepared for whatsoever subsequent finishing coat may be applied.

During the sanding operation, much of the liquid vehicle is volatilized so that the surface being acted upon approaches dryness even at this point, and could be left to "air dry," but in production it is best to run the sanded, filled and sealed work under a series of heat lamps or through any conventional dryer.

Where an extremely fine finish is required, the sanding operation may be effected in two stages, the second following immediately after the first and being performed under considerably lighter pressure.

The grit size of the sanding belt or other abrasive element used to effect the sanding depends upon the porosity of the surface being acted upon. For particle board which has a relatively porous structure, an eighty (80) mesh grit size is recommended, whereas for hard woods such as birch, a six-hundred (600) mesh sanding belt would be advisable.

Several ways of practising the invention without the use of the high polymer additive are described in the following examples, in each of which the surfaces treated were walnut, specifically the walnut sides of one quarter inch (¼") walnut plywood panels.

*Example No. 1*

The panels were fed by hand into a roller coater with their walnut sides up. The applicator roll of the roller coater, acting upon the top side of the panels, i.e. their walnut sides, applied a coat of nitro-cellulose lacquer to which burnt umber in powdered form had been added for coloring purposes. Excess lacquer was removed from the coated surface by a flexible steel scraper blade under which the panels passed after leaving the applicator roll.

From the roller coater the panels were fed into a "Timesaver" belt type sanding machine in which the direction of sanding belt travel was opposite the direction the work moved through the machine. The sanding belt had a six-hundred (600) mesh abrasive surface. As the sanding belt approached sanding engagement with the lacquer-coated surface of the panels, its abrasive surface was sprayed with mineral spirits. This was done with a row of spray nozzles extending across the width of the belt.

Since the lacquer is not soluble in mineral spirits, the abrasive surface of the sanding belt remained fully functional, while at the same time the wood particles abraded from the surface of the panels became coated with the lacquer composition and were compacted and pressed into the surface pores. The result was a smooth, beautiful surface fully prepared for any desired finish coat. I found that a single coat of lacquer was all that was needed.

*Example No. 2*

The procedure followed in this example was the same as that of Example No. 1, except that resin dissolved in aromatic hydrocarbon, with powdered burnt umber added for color was used. The specific resin used in this example is a product of the Archer Daniels Company, which sells it under the name "Aroplaz-462."

Mineral spirits was used to keep the sanding belt wet.

*Example No. 3*

Here again the procedure was the same as that of Example No. 1, but the coating composition used was acrylic resin dissolved in toluol, and available in the market under the name "Acryloid B-72," which is a product of Rohm and Haas. Again, burnt umber in powdered form was added to the resin for coloring, and mineral spirits was used to wet the sanding belt and keep it functional.

*Example No. 4*

In this example the procedure and apparatus used was the same as in the other samples, but the coating composition was a polyvinyl butyral resin dissolved in isopropyl alcohol with burnt umber added for coloring. This composition is available upon the market as a product of the Bakelite Company which designates it "XYHL." Mineral spirits was the wetting material.

An example of the practice of the invention using a coating composition with some of the high polymer additive added thereto now follows as:

*Example No. 5*

The panels used were of the same type as those of the preceding four examples, namely, one-quarter inch (¼") walnut plywood. The apparatus was the same, but the wetting coat applied to the panels consisted of alkyd urea formaldehyde which is a conversion type synthetic resin coating composition to which a polyester polymerizate and burnt umber were added, the polymerizate constituting twenty percent (20%) of the whole. The wetting material used was VMP naphtha.

While the selection of an appropriate synthetic resin polymerizate will no doubt suggest itself to those skilled in the art, the polymerizates disclosed in my pending application, Serial No. 157,257, filed December 5, 1961, have been found exceptionally well suited and adapted to the purpose of this invention. Those polymerizates are prepared by polymerization in an aqueous medium, of an emulsified polymerizable resin forming organic material, such as an alkyd resin together with urea formaldehyde or vinyl toluene, while agitating and heating the suspension, followed by separation of the polymerized material in the form of a curd or coagulate, and removal of water therefrom. After removal of the water and suitable drying, the polymerizate is in tack-free granular form, and may be redispersed in any one of a number of different liquid vehicles, including water, butylalcohol, isopropyl alcohol, lacquer solvents, and in fact nearly all organic solvents.

In the practice of this invention the polymerizate is dispersed in the selected liquid vehicle in a concentration determined only by its ease of handling. Two pounds of the dry polymerizate dispersed in a gallon of the liquid vehicle handles well if the material is brushed or rolled on, but for spraying the concentration may have to be diluted.

This highly polymerized material is insoluble and infusible. However, the polymerizate need not be absolutely insoluble and infusible. It is sufficient if it is insoluble in the liquid vehicle used and infusible at the temperatures reached in the process, and the appended claims should be construed in this light.

A specific example of the practice of the invention using only a synthetic resin polymerizate dispersed in a liquid vehicle follows as:

*Example No. 6*

The apparatus used in this example was of the same general type as that employed in the previous examples. The work surfaces treated were walnut, mahogany and birch plywood wall panels, and also "Timblend" particle board panels, the latter being a product of Roddis-Weyerhaeuser Timber Co. As in the previously described examples, the panels were fed into a roller coater where the applicator roll applied the alkyd-urea formaldehyde resin polymerizate of the aforesaid application Serial No. 157,257, dispersed in isopropyl alcohol to the surface of the panel as it is passed. Excess material was removed by a scraper blade under which the panels passed. With the surface thus wetted, the panels were fed into a "Timesaver" sanding machine. For the walnut, mahogany and birch panels, a four-hundred (400) mesh grit size belt was employed; for the "Timblend" particle board the grit size was eighty (80) mesh.

In addition to the synthetic resin polymerizates produced in accordance with the two methods described hereinbefore, it is also possible to employ plastisols and organosols to wet the surface being sanded. For instance, polyvinyl chloride plastisol in which the plasticizer is dioctyl phthalate or dioctyl sebacate, or tricresyl phthalate will work satisfactorily. The same plastisols reduced with a volatile organic liquid are examples of the organosols that could be employed.

The use of plastisols or organosols has the advantage of enabling the attainment of a more durable surface by the simple expedient of heating the treated surface to a temperature high enough to cause the dispersed polymerizate to go into solid solution.

In those of the various hereinbefore described ways of practicing this invention, wherein a film-forming coating composition was used to wet the work surface preparatory to the sanding operation, the abrasive surface of the sanding belt was kept functional by wetting the same with a non-solvent, or at least a poor solvent for the coating composition employed, applied to the abrasive surface of the sanding belt as it approached operational contact with the wet surface of the work. Instead of wetting the sanding belt with the non-solvent or poor solvent, the wetting material can be sprayed, or otherwise applied to the wet surface of the work as it approaches the sanding belt.

Still another way of practicing this form of the invention is to add a non-solvent to the coating composition solution. In this case the non-solvent chosen and the concentration of the solvent of the coating composition must be such that by virtue of the respective evaporation rates of the two, the non-solvent "kicks" the soluble film-forming binder out of solution just before the sanding belt contacts the wet surface of the work and keeps the composition from forming a film until the surface leaves the sanding zone.

The lacquer and mineral spirits of Example 1 have been admixed and successfully used. Obviously, of course, as long as the admixture is kept from evaporating, the needed balance between solvent and non-solvent remains unchanged. It is only after the dispersion is applied to a surface and the solvent and non-solvent begin to evaporate that the solution undergoes a change. The specific proportions of the two materials depends upon the length of time involved between wetting of the work surface and the instant the abrading action begins. The correct proportions can be arrived at empirically.

In all cases, the amount of non-solvent wetting material employed depends upon the amount of soluble binder in the coating composition. It should always be enough to keep the resinous binder out of solution during the period of operational contact between the abrasive surface and the work surface, but obviously for sake of economy it should not exceed the amount needed for this purpose. Here again those skilled in the art will find no difficulty making the necessary adjustment.

An advantage of spraying the non-solvent either onto the sanding belt or the wet surface of the work just before it is contacted by the sanding belt is that the non-solvent thus effects only the surface of the work and does not dilute the binder below the surface, which if it occurred would result in shrinkage of the compacted wood particles and binder filling the surface pores.

If the method of this invention is practiced by hand the selected liquid composition may be brushed or sprayed onto the surface to be finished and the abrading or sanding may be done in the customary way using sandpaper on a block, but the abrasive surface must be kept wet with the selected non-solvent by periodically dabbing the same on with a suitable applicator. However in production it is preferable to employ machinery, as was done in the several examples given and in the accompanying drawings:

FIGURE 1 is a perspective view more or less diagrammatically illustrating one type of machine which has been found entirely practicable;

FIGURE 2 is a view in side elevation, at a reduced scale, of the same machine but somewhat modified;

FIGURE 3 is a side view diagrammatically illustrating another form of apparatus used in the practice of the invention; and FIGURE 4 is a view similar to FIGURE 3 but showing a modified embodiment thereof.

The machine illustrated in FIGURES 1 and 2 comprises a more or less conventional belt sander often referred to as a high speed wide belt sander, consisting of an abrading or sanding belt 5, trained about a cylinder 6, and an idler roll 7, both journalled in suitable bearings (not shown). The cylinder 6 is driven at high speed in any suitable manner, as by an electric motor (not shown), and has its surface covered with a resilient layer 8 of rubber or the like, to provide a cushioned back-up surface for the portion of the sanding belt which the cylinder holds against the work. Where the sanding belt travels in the direction the work progresses through the machine, means must be provided to resist and control the advance of the work. This is done by rubber rolls 9 which frictionally grip the underside of the work and are driven at a slow speed in the work advancing direction. The rate of advance of the work should be on the order of 30 to 200 feet per minute, while the speed of the sanding belt is in the neighborhood of 2500 feet per minute.

Obviously, of course, the spacing between the cylinder 6 and the feed rolls 9 must be adjustable to accommodate panels or work of different thicknesses.

The idler roll 7, as shown, is so placed "downstream" from the cylinder 6 that unless extraneously held down, no part of the lower stretch of the sanding belt contacts the work, but if desired a shoe 11 may be provided to press this stretch of the belt lightly against the work surface and thus effect a secondary and lighter sanding of the surface. Where it is used, this second stage sanding assures a very fine work surface.

FIGURES 1 and 2 show the apparatus being employed for the practice of the invention using only a synthetic resin polymerizate dispersed in its liquid vehicle to provide both the binder for the particles abraded from the surface and to keep the abrasive surface of the belt operative. As shown in FIGURE 1, this dispersion may be applied to the top surface of the panel or work before it is contacted by the sanding belt, by rolling it on as illustrated by means of a roller 12 to which the liquid polymerizate dispersion is transferred from a trough 13 containing the same.

The manner in which the synthetic resin polymerizate is applied to the work is, of course, subject to modification. Thus instead of rolling it on, it could be brushed on in any suitable way, or as shown in FIGURE 2, it may be sprayed on by means of a series of nozzles 14 extending across the width of the machine. These nozzles (only one of which is shown) could be positioned to direct their sprays onto the work surface ahead of the abrading station, or as shown in FIGURE 2 they may be arranged to project their sprays onto the surface of the sanding belt as it travels around the cylinder 6. In this case a doctor blade 15 is preferably employed to spread the liquid polymerizate evenly over the surface of the sanding belt. This doctor blade, of course, would have to be formed of material not too seriously affected by tight contact with the surface of the sanding belt—rubber or synthetic rubber of medium hardness being an example of such material.

Spraying the wetting agent onto the surface of the sanding belt, as in FIGURE 2, has the advantage of keeping this surface cleaner and thus affording increased assurance against its becoming clogged or gummed up during use.

The apparatus diagrammatically illustrated in FIGURES 3 and 4 comprises a roller coater 20 and a belt sander 21 of the "Timesaver" type. Each of these machines has a work support shown here as a series of rollers 22 and 23, upon which the work undergoing treatment is supported as it passes through the machines. The roller coater has an applicator roll 24 by which the selected composition is transferred from a trough 25 to the surface of the work, and a wiping roll 26 to remove the excess material.

The belt sander has its sanding belt 27 trained over a pressure cylinder 28 and an idler roll 29 mounted above the cylinder, and as shown the belt travels in opposition to the direction the work travels, it being understood that means not shown advances the work through the machine.

In that embodiment of the belt sander shown in FIGURE 3, a series or row of nozzles 30 (only one of which is shown) is mounted to direct sprays of wetting material onto the abrasive surface of the belt just before it comes into operational contact with the work. The wetting material, as explained hereinbefore, is a non-solvent or at least a poor solvent for the coating composition applied to the work surface by a roller coater. In the modified construction shown in FIGURE 4, the nozzles 30' from which the non-solvent issues are positioned to direct their sprays onto the work just before it is contacted by the abrasive belt.

Another way of practicing the invention is to incorporate loose abrasive particles in the liquid wetting agent. This obviates the need for a sanding belt, as such, and permits using a smooth surfaced belt or other suitable fast moving pressure applying member in lieu thereof. Obviously, this modified embodiment of the invention completely eliminates the problem of keeping the belt or its equivalent clean and functional.

The structure required for the practice of this modified embodiment of the invention may be like that illustrated in either FIGURE 1 or FIGURE 2, except that the belt 5 would be smooth surfaced, and of course the belt could be made of any suitable material.

From the foregoing description taken with the accompanying drawings, it will be apparent to those skilled in this art that this invention effects a significant saving in the cost of preparing the surfaces of wood and particle board for finishing. It will also be apparent that while the invention is particularly useful in the preparation of natural wood and particle board, other materials such as fiber board and so-called hard board may be beneficially treated by this method; and, of course, it is understood that such changes in the hereindisclosed invention may be made as come within the scope of the claims.

What is claimed as my invention is:

1. The method of preparing a porous wood and the like surface for finishing, which comprises:
    (A) wetting the surface with a liquid composition which comprises a solution of a resinous material and a volatile liquid which volatilizes at the temperature reached in the practice of the method and in which said resinous material is insoluble, the resinous material being infusible at the temperatures reached in the practice of the method and being incapable of forming a film until its solvent and said volatile liquid are voltailized; and
    (B) while the surface is wet with said liquid composition subjecting it to a combined abrading and pore filling operation which comprises
   (1) abrading said wet surface to thereby abrade small particles from the surface,
   (2) commingling and combining the abraded particles with the resinous material, and
   (3) pressing and compacting the resulting mixture into the surface pores.

2. The method of claim 1, wherein the volatile liquid is an admixture of a solvent and a non-solvent for the resinous material, and wherein a part of the resinous material is film-forming and soluble in the solvent fraction of said admixture, while the remainder thereof is a highly polymerized synthetic resin that is not soluble in the solvent and not film-forming at the temperatures reached in the practice of the method.

3. A method of preparing for finishing the surface of a piece of material such as wood which has pores that must be filled to assure a good finish, which method comprises:
   (A) wetting the surface with a liquid composition containing a solution of a resinous material which is capable of forming a binder for particles abraded from the surface and which adheres to said surface;
   (B) passing the piece of material through an abrading zone;
   (C) in said zone and by means of an abrading element having an abrasive surface,
      (1) abrading particles from the thus wetted surface,
      (2) coating the particles with the composition, and
      (3) driving the coated particles into the pores of the surface; and
   (D) keeping the abrasive surface of the abrading element free of accumulations which would impair its ability to abrade the surface of the piece by thoroughly wetting the abrasive surface of the abrading element with a liquid that is at best a poor solvent for the resinous material of said composition.

4. The method of claim 3, wherein:
the liquid composition used to wet the surface being acted upon comprises a resinous coating composition for wood surfaces containing a solvent which does not fully evaporate until after the abrading operation and which composition upon evaporation of its solvent forms a film which seals the surface to which the coating composition is applied; and wherein
the abrasive surface of the abrading element is kept functional by keeping said zone of contact between the abrading element and the surface being acted upon wet with a liquid which is at best a poor solvent for the coating composition, to thereby assure against the coating composition forming a film in said zone.

5. The method of claim 4, further characterized by the step of adding a coloring material to the coating composition.

6. The method of claim 4, wherein:
the liquid composition also contains a highly polymerized synthetic resin polymerizate dispersed in the composition and which resin polymerizate is infusible at the temperatures reached in the practice of the method, and insoluble in the coating composition.

7. A method whereby a wood surface may have its surface pores filled, and its surface sealed and sanded smooth all in one operation, said method comprising:
   (A) applying to said surface a liquid coating composition containing a dissolved resinous component which is capable of forming a binder for wood particles abraded from the surface and which forms a sealing film on the surface as its solvent evaporates;
   (B) while the surface is wet with said liquid coating composition, abrading the surface with an abrading element having an abrasive surface to thereby
      (1) abrade wood particles from that surface;
      (2) coat the particles with the coating composition, and
      (3) drive the coated particles into the pores of the surface; and
   (C) keeping the abrasive surface of the abrading element functional by wetting the zone of operational contact between the abrading element and the surface being acted upon with a liquid which is volatile at the temperatures reached in the practice of the method and which is at best a poor solvent for the resinous component of the coating composition.

8. The method of preparing highly porous wood and the like surfaces for finishing, which comprises:
   (A) wetting the surface with a composition comprising a highly polymerized synthetic resin polymerizate dispersed in a liquid in which said resin is insoluble, said resin being infusible and incapable of forming a film at the temperature reached in the pratcice of the method; and
   (B) while said surface is thus wetted, subjecting it to a combined abrading and pore filling operation which comprises
      (1) abrading the thus wetted surface to thereby abrade small particles from the surface,
      (2) commingling and combining the abraded particles with the dispersed polymerizate, and
      (3) pressing and compacting the resulting mixture into the surface pores.

9. The method of claim 8, wherein the abrading operation is performed with sandpaper.

10. The method of claim 8, wherein the abrading is done by means of a belt-type sanding machine having an endless sanding belt, and wherein the wetting of the surface is done by applying said resin composition to the abrasive surface of the sanding belt.

11. The method of claim 8, wherein the abrading is done by progressively engaging the surface to be prepared with a rapidly moving smooth surfaced pressure-applying member, and feeding loose abrasive particles between the pressure-applying member and the surface to be prepared, by incorporating the abrasive particles in said resin composition.

12. The method of claim 10, wherein the application of said resin composition to the sanding belt is effected by spraying the composition onto the abrasive surface of the sanding belt just before the latter comes in contact with the surface being prepared.

13. The method of preparing a porous wood and the like surface, which comprises:
   (A) wetting said porous surface with a composition comprising
      a highly polymerized synthetic resin polymerizate dispersed in a liquid vehicle, the polymerizate being infusible at the temperatures reached in the practice of the method and being incapable of forming a film; and
   (B) while said surface is thus wetted, subjecting it to an abrading and pore-filling operation comprising
      (1) simultaneously abrading fine particles of material from said wetted surface,
      (2) combining said abraded particles with said dispersed resin polymerizate, and
      (3) forcing the thereby produced combination of particles and resin into the pores of said porous surface.

References Cited in the file of this patent

UNITED STATES PATENTS

| | | |
|---|---|---|
| 1,999,259 | Rozema | Apr. 30, 1935 |
| 2,292,468 | Oeffinger et al. | Aug. 11, 1942 |
| 2,341,161 | Partee et al. | Feb. 8, 1944 |
| 2,565,036 | MacDonald | Aug. 21, 1951 |
| 2,765,598 | Judd | Oct. 9, 1956 |
| 3,090,695 | Orth | May 21, 1963 |